United States Patent Office 2,917,326
Patented Dec. 15, 1959

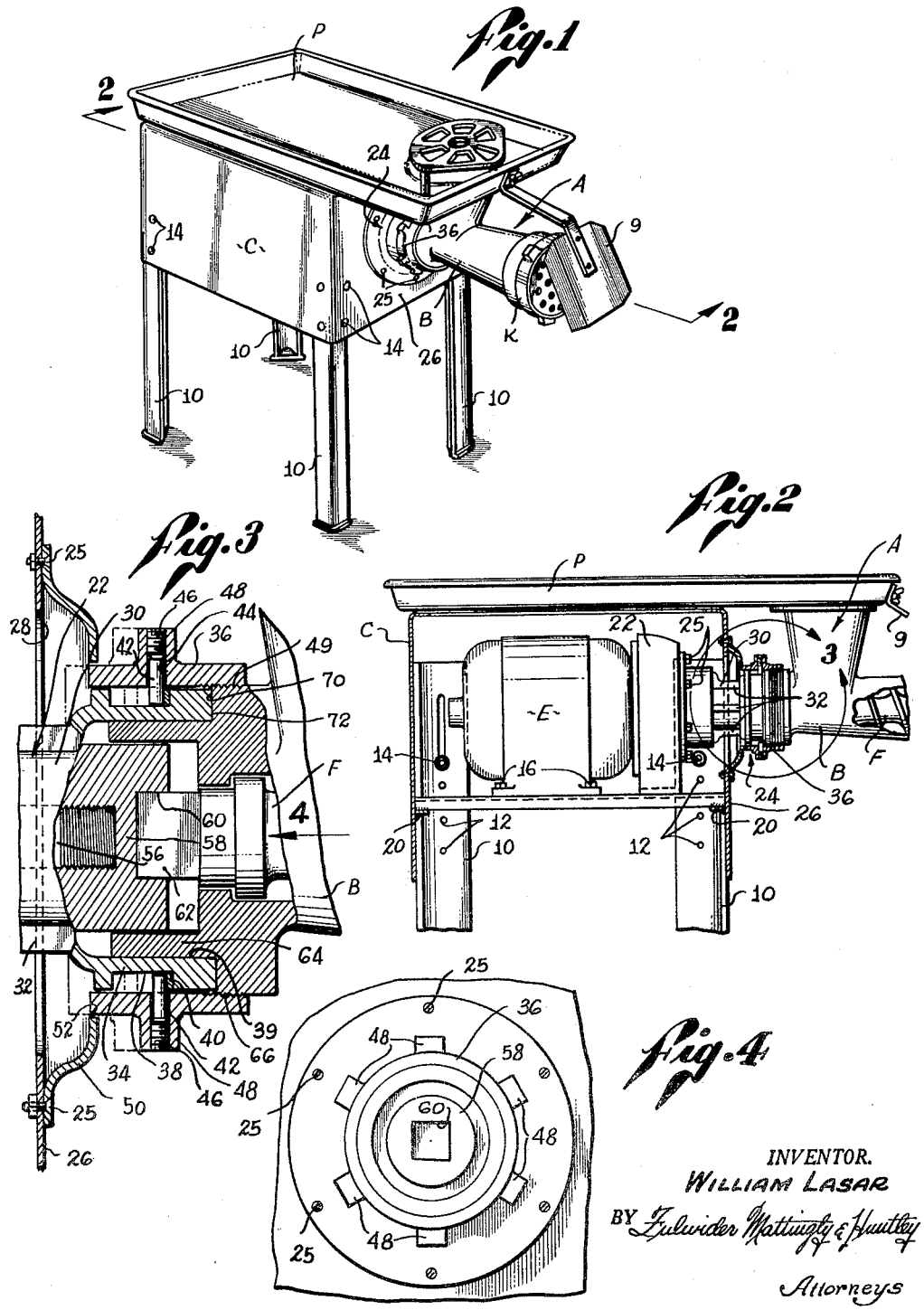

2,917,326

GUIDED COUPLING WITH RETRACTABLE SLEEVE

William Lasar, Downey, Calif.

Application August 18, 1954, Serial No. 450,674

1 Claim. (Cl. 285—24)

The present invention relates generally to the field of butchering and more particularly to a new and improved device for grinding or chopping meat.

Electric motor-driven meat grinding devices are widely utilized in the field of butchering. These devices include an open-topped bowl wherein a helical feed screw is rotated at high speed so as to draw meat into a knife and plate unit, the latter unit actually providing the meat chopping or grinding action. The knife and plate unit is generally located at the front end of the bowl. The bowl is detachably secured to a stationary frame or cabinet at its rear end. An electric motor disposed within the cabinet drives the feed screw through a gear box, the shaft of which is removably coupled to the rear end of the feed screw when the bowl is secured to the housing.

In the interest of health, it is important that the bowl assembly comprising the bowl and feed screw be removed from the cabinet after each working day for thorough cleaning. It is also important that the longitudinal axis of the feed screw always be perfectly aligned with that of the shaft of the gear box. This is true since unless such alignment exists, the feed screw cannot rotate freely within the bowl and the bowl assembly will wobble during a meat grinding operation. This results in a shorter useful service life, wasted power, and excessive heating of the meat being ground.

It is a major object of the present invention to provide a novel and improved meat grinding device.

It is a further object to provide a meat grinding device having a bowl assembly which may be quickly and easily detached from its cabinet thereby encouraging frequent cleaning of the device.

Another object of the invention is to provide a meat grinding device of the aforedescribed nature having novel means for detachably securing the bowl to the cabinet in such a manner that the longitudinal axis of its feed screw will always remain aligned with that of its driving shaft. Additionally, this novel securing means provides a positive lock between the bowl assembly and its cabinet throughout the service life of the device despite the occurrence of wear. A positive lock cannot be provided by the heretofore-proposed securing means after they have become worn.

Yet a further object is to provide a meat grinding device which is simple in design and rugged in construction whereby it may provide a long and useful service life.

An additional object is to provide a meat grinding device having a bowl assembly which may be attached to and disengaged from its cabinet by even a comparatively unskilled workman.

These and other objects and advantages of the present invention will become more apparent from the following detailed description of a preferred embodiment thereof, when taken in conjunction with the appended drawings wherein:

Figure 1 is a perspective view showing a preferred form of meat grinding device embodying the present invention;

Figure 2 is a partial vertical sectional view taken along line 2—2 of Figure 1;

Figure 3 is an enlarged view of the encircled area designated 3 in Figure 2 and partly broken away in section; and Figure 4 is a front view in reduced scale of said meat grinding device taken from a point designated 4 in Figure 3.

Referring to the drawings, the preferred form of meat grinding device embodying the present invention includes a cabinet C to the top of which is secured a meat pan P and from the front of which extends a bowl assembly A. The latter includes a helical feed screw F that is rotated within a bowl B by an electric motor E so as to urge meat to be ground or chopped forwardly through the bowl B into a knife and plate unit K. The bowl assembly A is removably coupled to the front of the cabinet C in a novel manner to be fully described hereinafter. A spurt guard 9 may be provided for the front of the knife and plate unit K.

The cabinet C is generally rectangular and of watertight construction. It may be supported upon four legs 10 in such a manner that the height of the meat pan P from the floor can be adjusted to suit the desires of the workman operating the device. Each leg 10 is formed with a plurality of vertically spaced bores 12 for receiving suitable bolt and nut combinations 14. As shown in Figure 2, the electric motor E is rigidly secured by bolts 16 to a horizontal shelf carried between supports 20 extending between the side walls of the cabinet C. Forwardly of the electric motor E there is rigidly mounted a gear box 22, and a bearing and chuck housing, generally designated 24, is rigidly secured as by bolts 25 to the front wall of the gear box 22. The front wall 26 of the cabinet C is formed with an aperture 28 through which the neck 30 of the bearing and chuck housing 24 extends. The neck 30 is formed with stiffening webs 32. The front portion of the neck 30 is of enlarged diameter and includes a cylindrical receiver, generally designated 34, which journals a bowl locking ring, generally designated 36. The intermediate portion of the receiver 34 is formed with an annular coaxial recess 38, and a snap ring 40 is disposed within this recess 38 for a purpose to be set forth hereinafter. The receiver 34 is likewise formed with a coaxial bore 39.

The bowl locking ring 36 is free to rotate relative to its receiver 34 but is restrained against unrestricted axial movement relative thereto by a plurality of radially extending locking pins 42, the radially inner ends of said pins being disposed within the recess 38. The locking pins 42 are carried within radially extending bores 44 formed in the bowl locking ring 36 and they are restrained against radially outward movement with respect thereto by set screws 46. The set screws 46 are threadedly secured within bosses 48 through which the radially outer ends of the bores 44 are extended. A cover plate 50 secured to the front wall of the cabinet C is formed with a bore 52 that encompasses the rear portion of the bowl locking ring 36. The front portion of the bowl locking ring is formed with internal threads 49.

As shown in Figures 3 and 4, the free end of the gear box shaft 56 is threadedly secured to a cylindrical chuck 58 formed with a square cavity 60. This cavity 60 receives a complementary square boss 62 formed at the rear end of the feed screw F when the bowl assembly A is in operating position. Outwardly of the boss 62 the rear portion of the bowl B is formed with a collar 64 that telescopically interfits the receiver bore 39 when the bowl assembly A is in operating position. Forwardly of the collar 64 the bowl B is formed with external threads 66 that are engageable with the internal threads 49 of the bowl locking ring 36.

In order to secure the bowl assembly A to the bearing and chuck housing 24, the locking ring 36 is brought to its dotted line position of Figure 3 and feed screw boss 62 disposed within the chuck cavity 60. The collar 64 of the bowl B is disposed within the annular recess defined between the outer peripheral surface of the chuck 58 and the bore 39 of the receiver 34. The bowl assembly A will remain in this position while the bowl locking ring 36 is rotated relative to the bearing and chuck housing 24 and the feed screw F. Such rotation may be accomplished by means of a suitable wrench (not shown). This rotation of the bowl locking ring serves to urge the bowl assembly A to the left relative to Figure 3 until the rear surface 70 of the bowl B abuts the face 72 of the bearing and chuck housing's receiver 34, as indicated by the solid outline of the bowl assembly and bowl locking ring in this figure. One the bowl locking ring 36 has been tightened to the proper degree the snap ring 40 will restrain it against inadvertent rotation in the opposite direction.

It should be particularly observed that the bowl locking ring 36 will always maintain the longitudinal axis of the feed screw F aligned with that of the gear box shaft 56. This alignment will be provided even when the device has become worn. It should likewise be observed that even should the bowl locking ring 36 be insufficiently tightened, the entire area of the rear surface 70 of the bowl B will be disposed at a uniform distance from the face 72 of the receiver 34.

While there has been shown and described hereinbefore what is presently considered to be the preferred embodiment of the present invention, it will be apparent that various modifications and changes may be made thereto without departing from the spirit of the invention or the scope of the appended claim.

I claim:

A coupling for removably securing a grinding bowl to the frame of a meat grinding machine, comprising: a fixed cylindrical receiver on the front end of said frame formed with a coaxial bore and having a radially extending front face, said receiver also being formed at a distance spaced rearwardly of said face with an annular radially inwardly extending recess; a collar formed at the rear end of said bowl that telescopically and snugly interfits the coaxial bore of said receiver, said bowl extending radially outwardly forwardly of said collar to define a radially extending rear surface aligned with and adapted to abut the front face of said receiver, said bowl being formed with an externally threaded, locking ring receiving-surface that extends forwardly from the radially outer portion of said rear surface; an integral locking ring rotatably mounted on said receiver, the front portion of said locking ring being internally threaded whereby it may be engaged with the locking ring receiving-surface of said bowl to thereby removably secure said bowl to said receiver; radially inwardly extending pin means carried by said locking ring and extending into the recess of said receiver, said pin means having a diameter less than the axial width of said recess whereby said locking ring may be moved rearwardly on said receiver until its front end is disposed rearwardly of the front face of said receiver and said collar can be telescopically interfitted within the coaxial bore of said receiver to thereby temporarily support said bowl upon said receiver as said locking ring is advanced forwardly and threadedly coupled to said bowl, with the engagement of said pin means with the rear end of said recess retaining said locking ring against inadvertent rearward disengagement from said receiver; and a snap ring disposed in the recess of said receiver forwardly of said pin means to restrain said locking ring against inadvertent rotation in a direction to unthread said ring from said bowl after said locking ring is threadedly coupled to said bowl.

References Cited in the file of this patent

UNITED STATES PATENTS

| | | |
|---|---|---|
| 863,844 | Hammer | Aug. 20, 1907 |
| 964,578 | Stephens | July 19, 1910 |
| 1,880,638 | Wood et al. | Oct. 4, 1932 |
| 2,006,828 | Flynt | July 2, 1935 |
| 2,100,069 | Creveling | Nov. 23, 1937 |
| 2,243,960 | Hotchkiss | June 3, 1941 |
| 2,390,103 | Johnson | Dec. 4, 1945 |
| 2,655,967 | Mallory | Oct. 20, 1953 |
| 2,693,835 | Lundell | Nov. 9, 1954 |
| 2,723,136 | Denbler | Nov. 8, 1955 |
| 2,726,104 | Boitnott et al. | Dec. 6, 1955 |